(12) United States Patent
Kubica

(10) Patent No.: US 8,600,809 B1
(45) Date of Patent: Dec. 3, 2013

(54) PREDICTIVE MODEL PERFORMANCE

(75) Inventor: Jeremy Kubica, Wexford, PA (US)

(73) Assignee: Google Inc., Mountain View, CA (US)

( * ) Notice: Subject to any disclaimer, the term of this patent is extended or adjusted under 35 U.S.C. 154(b) by 60 days.

(21) Appl. No.: 13/071,784

(22) Filed: Mar. 25, 2011

(51) Int. Cl.
*G06Q 30/00* (2012.01)

(52) U.S. Cl.
USPC ........ 705/14.41; 707/706; 707/709; 707/713; 707/722; 705/14.49; 705/14.73

(58) Field of Classification Search
USPC ......... 705/14.41, 14.49, 14.73; 707/706, 709, 707/713, 722
See application file for complete search history.

(56) References Cited

U.S. PATENT DOCUMENTS

| 5,668,988 | A * | 9/1997 | Chen et al. ............................ 1/1 |
| 5,704,017 | A * | 12/1997 | Heckerman et al. ............. 706/12 |
| 6,591,248 | B1 * | 7/2003 | Nakamura et al. ......... 705/14.52 |
| 6,925,347 | B1 * | 8/2005 | Miller et al. .................. 700/121 |
| 7,171,464 | B1 * | 1/2007 | Raghuraman et al. ........ 709/224 |
| 2003/0050863 | A1 * | 3/2003 | Radwin ........................... 705/27 |
| 2003/0149938 | A1 * | 8/2003 | McElfresh et al. ........... 715/517 |
| 2007/0143795 | A1 * | 6/2007 | Tran ................................ 725/46 |
| 2007/0245163 | A1 * | 10/2007 | Lu et al. ......................... 713/300 |
| 2007/0266305 | A1 * | 11/2007 | Cong et al. .................. 715/500.1 |
| 2008/0249832 | A1 * | 10/2008 | Richardson et al. ............ 705/10 |

OTHER PUBLICATIONS

Fang, Julia ; Implementation of the Pan-Starrs Image Processing Pipeline; Institute for Astronomy, University of Hawaii at Hilo, Hawaii; Sep. 4, 2007; [online] Retrieved from the Internet electronic mail: http://www.ifa.hawaii.edu/reu/2007research/fang.pdf on May 24, 2012.

* cited by examiner

*Primary Examiner* — Cheyne D Ly
(74) *Attorney, Agent, or Firm* — Fish & Richardson P.C.

(57) ABSTRACT

Methods, systems, and apparatus, including computer programs encoded on a computer storage medium, for analyzing outcome estimation models. In one aspect, a method includes providing tracer data to a content performance estimation model. The tracer data specify feature values for a reference content item that is not distributed to users, and for which a reference performance measure is pre-defined. An estimated performance measure that was computed for the reference content item is received from the performance estimation model. An accuracy measure is computed for the content performance estimation model using the estimated performance measure and the reference performance measure. Data are provided that specify the accuracy measure for the content performance estimation model.

22 Claims, 4 Drawing Sheets

PREDICTIVE MODEL PERFORMANCE

BACKGROUND

This specification relates to data processing.

The performance of content items (i.e., units of content that are presented in (or with) resources) are often tracked by a system that manages the content items. For example, an advertisement server may track the performance of advertisements it serves by recording the number of impressions the advertisement receives, and the number of clicks on the advertisements, in performance data. Such performance data can be processed to generate predictive models that can predict the performance of the same or similar content items for future content item presentations.

Data mining is one such example process to generate predictive models. Data mining is used, for example, to identify feature values that are associated with a data set of content items and that are indicative of a particular result. A feature value is a value that represents a state or measurement of a feature. Feature values are often used to represent characteristics of content items (e.g., advertisements, audio, video, or text). For example, feature values can be values that represent specific colors, animation characteristics, size characteristics, similarity measures, and other features of content items. Feature values can be selected from a specified set of discrete values (e.g., 0 or 1) or feature values can be selected from a continuous range of values (e.g., 0-10). For example, a feature value of 0 (representing "no") or 1 (representing "yes") can be used to specify whether an advertisement is a static advertisement (i.e., is not animated). Similarly, a set of feature values can be used to specify one or more colors (e.g., 00 representing black and 01 representing red) that are included in an advertisement.

The results (e.g., performance data) associated with the data set and the identified feature values for the data set and can be used to create and train a model that predicts future outcomes or results for a content item represented by a data record storing feature values that describe the content item. For example, curve fitting techniques (e.g., regression analysis, logistic regression, etc.) can be used to generate a model that specifies relationships between feature values and outcomes. In turn, the model can be applied to feature values of a data record to obtain an outcome or result based on the feature values of the data record. Data classifiers (e.g., support vector machines) can also be used to classify data into one or more specified data classifications.

The quality of models generated using different modeling techniques is generally judged using corresponding measures of prediction quality (e.g., accuracy measures and/or error measures). For example, regression techniques may use a measure such as Mean Square Error to measure how accurately a regression model is estimating outcome values, while a ranking model (e.g., a support vector machine) that is generated to estimate relative rankings of data records may use a measure such as the area under a receiver operating characteristic (ROC) curve to determine how well the ranking model is estimating relative ranks for data records. The accuracy measures can be computed, for example, by analyzing the actual performance of content items relative to the predicted performance. However, the actual performance of content items can vary for many different reasons (e.g., seasonal changes in user behavior), such that the accuracy measures may not reliably represent the actual quality of the predictive model.

SUMMARY

In general, one innovative aspect of the subject matter described in this specification can be embodied in methods that include the actions of providing tracer data to a content performance estimation model, the tracer data specifying feature values for a reference content item, the reference content item being a content item that is not distributed to users and for which a reference performance measure is pre-defined; receiving, from the performance estimation model, an estimated performance measure that was computed by the performance estimation model for the reference content item; computing an accuracy measure for the content performance estimation model, the accuracy measure being computed using the estimated performance measure and the reference performance measure; and providing data that specify the accuracy measure for the content performance estimation model. Other embodiments of this aspect include corresponding systems, apparatus, and computer programs, configured to perform the actions of the methods, encoded on computer storage devices.

These and other embodiments can each optionally include one or more of the following features. A content performance estimation model can be a model that has been trained to estimate performance measures for eligible content items that are eligible to be provided to user devices, and wherein the model is trained using feature values of content items that have been provided to user devices and performance measures for the provided content items.

Methods can further include the actions of determining that the accuracy measure does not meet an accuracy threshold; and adjusting the content performance estimation model in response to the determination.

Methods can further include the actions of determining that the accuracy measure does not meet an accuracy threshold; and selecting a different content performance estimation model in response to the determination.

The reference performance measure for the reference content item can be substantially constant. The tracer keyword can be a phrase that has not previously been received from a user device as a search query. The tracer keyword can be a phrase that has been received from less than a threshold quantity of user devices.

Providing tracer data can include providing tracer data for a reference content item that is targeted for presentation using a tracer keyword. Providing tracer data to a content performance estimation model can include providing tracer data for a content item that is not eligible to be presented in response to requests for content items that are being requested for a user device. Computing an accuracy measure can include computing a log likelihood measure using the estimated performance measure and the reference performance measure. Computing an accuracy measure can include computing an area under the curve measure.

Methods can further include the actions of generating a tracer performance log that includes a set of tracer log entries, each tracer log entry specifying tracer interaction data for a reference content item, the tracer interaction data for each reference content item specifying a quantity of interactions that is based on the reference performance measure for the reference content item.

Methods can further include the actions of submitting a request for a content item, the request including a tracer keyword that has been received from less than a threshold number of user devices; receiving the reference content item in response to submitting the request; and providing click data specifying an interaction with the reference content item, the click data being provided with a probability based on the reference performance measure. Particular embodiments of the subject matter described in this specification can be implemented so as to realize one or more of the following advantages. Outcome estimation can be more accurately performed by ensuring that the outcome estimation models are accurately predicting outcomes. Outcome estimation models can be evaluated independent of temporary variations in actual outcomes.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
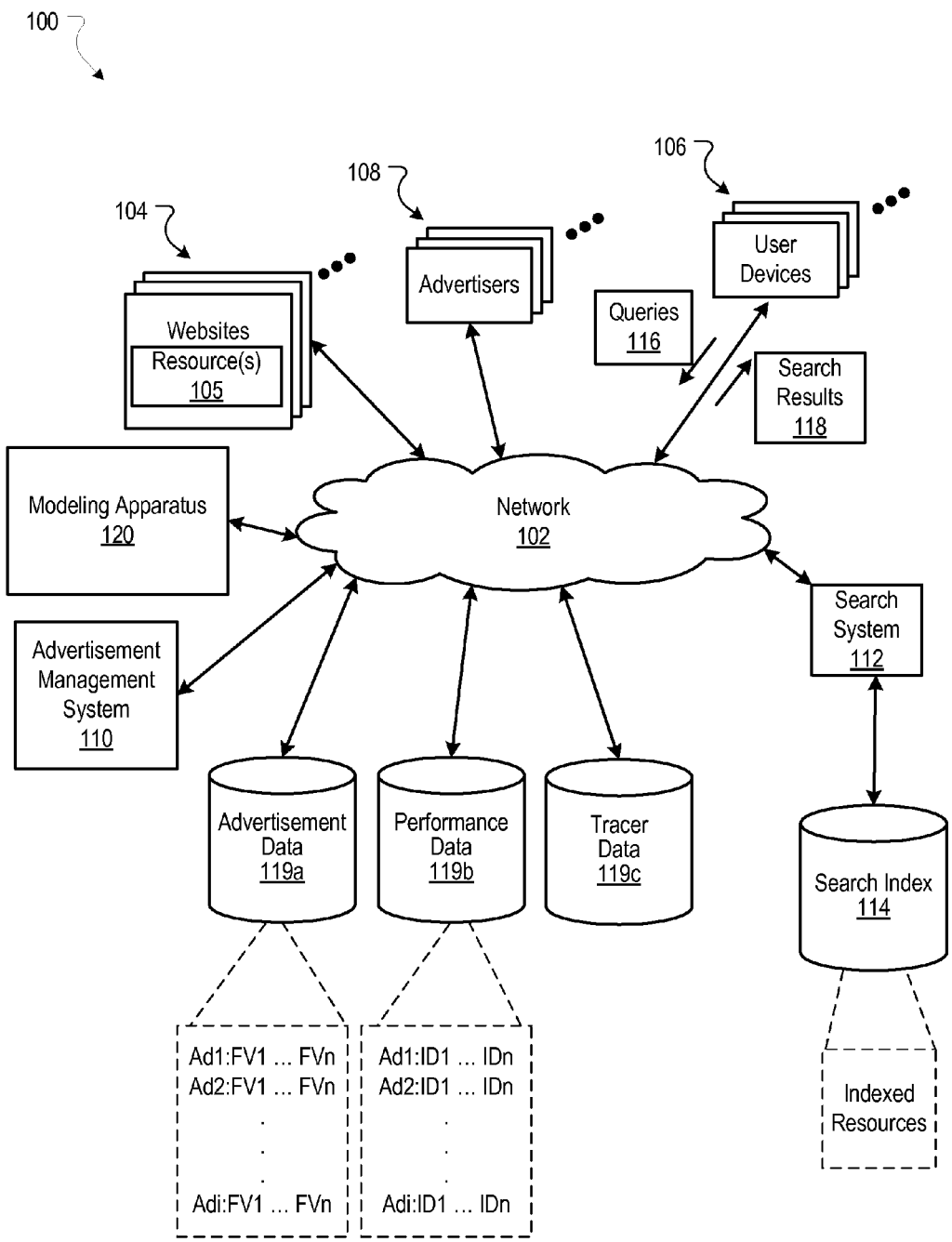
FIG. 1 is a block diagram of an example environment in which an advertisement management system manages advertising services.

The accuracy of an outcome estimation model is analyzed using tracer data (e.g., artificial data that are inserted into a system) that specify feature values for a reference content item. The reference content item is a content item that has a pre-defined performance measure. In some implementations, the outcome estimation model is a model that estimates a likelihood (e.g., a probability) with which a content item (e.g., an advertisement or search result) will be selected (e.g., clicked) by a user. With respect to advertisements, for example, this estimated likelihood is used to determine whether a particular advertisement will be selected for presentation with a particular web page and to select a relative position at which the advertisement will be presented on the web page. For example, assume that the outcome estimation model estimates that a particular advertisement will be clicked with a probability of 20%.

Outcome estimation model accuracy is generally evaluated based on a measure of error that is computed using the output of the model relative to the actual performance of the content item. However, analyzing the accuracy of the outcome estimation model based on the actual performance of the content item may not accurately reflect the accuracy of the outcome estimation model because the actual performance of the content item depends on user behavior following presentation of content items, and user behavior can vary for many different reasons. For example, user interaction with some content items (e.g., flower advertisements) may be higher during certain times of the year (e.g., near Valentine's Day or Mother's Day) than other times of year. Thus, during these times of the year, the measure of error that is used to evaluate the outcome estimation model may be artificially high.

As described in more detail below, tracer data can be used to evaluate the accuracy of an outcome estimation model. Tracer data are data that specify feature values for a reference content item that is not presented to users (e.g., an artificial advertisement), and a reference performance measure (e.g., a constant click-through-rate) for the reference content item.

Because the tracer data specify a reference performance measure, the tracer data provide a ground truth performance measure against which the output of an outcome estimation model can be compared to determine the accuracy of the outcome estimation model independent of temporary changes in user behavior. For example, if an artificial advertisement has a constant click-through-rate of 0.3, then the accuracy of the model can be evaluated by comparing the output of the model to the click-through-rate of 0.3.

The description that follows describes using tracer data to evaluate the accuracy of an outcome estimation model that is generated by a modeling apparatus that is part of an advertisement management system (i.e., a system that manages advertising services). However, tracer data can also be used to evaluate the accuracy of other models that are generated by a modeling apparatus that is implemented independent of the advertisement management system and/or with other systems (e.g., a search system) that use expected outcomes to select content items for presentation.

For example, tracer data can be used to evaluate the accuracy of an outcome estimation model that computes selection scores that are used to select search results for presentation in a search results page (e.g., using prior user selection data as a measure of relevancy of a search result to search queries), selection scores that are used to select an order in which to organize e-mails (e.g., based on user selection history and feature values associated with the selected e-mails), or selection scores that are used to recommend products or items (e.g., movies) to a user based on the user's previous star ranking of other products or items.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources 105, the environment 100 can include a search system 112 that identifies the resources 105 by crawling and indexing the resources 105 provided by the publishers on the websites 104. Data about the resources can be indexed based on the resource 105 to which the data corresponds. The indexed and, optionally, cached copies of the resources 105 are stored in a search index 114.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. An example search result 118 can include a web page title, a snippet of text or a portion of an image extracted from the web page, and the URL of the web page. Search results pages can also include one or more advertisement slots in which advertisements can be presented.

When a resource 105 or search results 118 are requested by a user device 106, the advertisement management system 110 receives a request for advertisements to be provided with the resource 105 or search results 118. The request for advertisements can include characteristics of the advertisement slots that are defined for the requested resource or search results page, and can be provided to the advertisement management system 110.

For example, a reference (e.g., URL) to the resource for which the advertisement slot is defined, a size of the advertisement slot, and/or media types that are eligible for presentation in the advertisement slot can be provided to the advertisement management system 110. Similarly, keywords associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 selects advertisements that are eligible to be provided in response to the request ("eligible advertisements"). For example, eligible advertisements can include advertisements having characteristics (e.g., size and/or aspect ratio) matching the characteristics of advertisement slots and that are identified as relevant to specified resource keywords or search queries 116. In some implementations, advertisements having targeting keywords that match the resource keywords or the search query 116 are selected as eligible advertisements by the advertisement management system 110.

A targeting keyword can match a resource keyword or a search query 116 by having the same textual content ("text") as the resource keyword or search query 116. The relevance can be based on root stemming, semantic matching, and topic matching. For example, an advertisement associated with the targeting keyword "hockey" can be an eligible advertisement for an advertisement request including the resource keyword "hockey." Similarly, the advertisement can be selected as an eligible advertisement for an advertisement request including the search query "hockey."

A targeting keyword can also match a resource keyword or a search query 116 by having text that is identified as being relevant to a targeting keyword or search query 116 despite having different text than the targeting keyword. For example, an advertisement having the targeting keyword "hockey" may also be selected as an eligible advertisement for an advertisement request including a resource keyword or search query for "sports" because hockey is a type of sport, and therefore, is likely to be relevant to the term "sports."

Targeting keywords and other data associated with the distribution of advertisements can be stored in an advertising data store 119a. The advertising data store 119a is a data store that stores data representing the advertisements, such as an advertisement identifier (e.g., Ad1 ... Adi) and feature values (FV1 ... FVn) that are associated with each respective advertisement. The advertising data store can also store associations between advertisements, advertising campaign parameters that are used to control distribution of the advertisements. For example, the advertising data store 119a can store targeting keywords, bids, and other criteria with which each respective advertisement can be selected for presentation.

Data representing conditions under which advertisements were selected for presentation to a user, and user interaction data (e.g., Id1 ... Idn) representing actions taken by users in response to presentation of the advertisement (e.g., Ad1 ... Adi) can be stored in a data store such as performance data store 119b.

For example, the performance data store 119b can store data specifying targeting keywords that caused presentation of the advertisement (e.g., that matched a resource keyword or search query), resource keywords and/or search queries that matched the targeting keywords, ad slots in which the advertisement appeared, characteristics (e.g., locations and sizes) of the ad slots, and any special characteristics that might have been applied to the advertisement. Example characteristics that can be applied to an advertisement include the advertisement being presented with an image, the advertisement being presented with (e.g., adjacent to) multiple links (e.g., hypertext links) to different landing pages for the advertiser, or the advertisement being provided with a link that, in response to selection of the link, causes the advertisement to expand and revealing additional information associated with the advertisement (e.g., revealing a map, presenting a video clip, or providing product purchasing information).

The performance data store 119b can also store user interaction data specifying user interactions with presented advertisements (or other content items). For example, when an advertisement is presented to the user, data can be stored in the performance data store 119b representing the advertisement impression. When a user selects (i.e., clicks) a presented advertisement, selection data is stored in the performance data store 119b representing the user selection of the advertisement.

In some implementations, the selection data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the performance data store 119b. Likewise, data indicating that an advertisement was not selected when it was presented can also be stored in the performance data store 119*b*.

The advertisement management system 110 typically selects the advertisements that are provided for presentation in advertisement slots of a resource or search results page based on results of an auction. For example, the advertisement management system 110 can receive bids for advertisements and allocate the advertisement slots to the advertisements with the highest selection scores at the conclusion of the auction. The bids are amounts (e.g., maximum prices) that the advertisers will pay for presentation (or selection) of their advertisement with a resource or search results page. For example, a bid can specify an amount that an advertiser will to pay for each 1000 impressions (i.e., presentations) of the advertisement, referred to as a CPM bid. Alternatively, the bid can specify an amount that the advertiser is will pay for user selection (i.e., a click-through) of the advertisement or a "conversion" (e.g., when a user performs a particular action related to an advertisement provided with a resource or search results page) following selection of the advertisement.

The auction winners are determined based on the selection scores. A selection score is a value based, in part, on a bid and from which advertisements are selected for presentation. Each selection score can represent a bid value, or a product (or another function) of the bid value and one or more factors. In some implementations, the selection score is a product of the bid specified by the advertiser and an estimated click-through likelihood (eCTL) associated with the advertisement, which can also be referred to as an estimated click-through rate. An eCTL is a value that specifies a likelihood (e.g., a probability) that an advertisement (or another content item) is selected by a user in response to a particular presentation of the advertisement (or other content item). For example, an eCTL of 0.30 for a particular advertisement can specify that there is a 30% likelihood that the particular advertisement will be selected by a user if presented.

For example, assume that advertiser A selects a $1.00 cost per click bid ("CPC" bid) and advertiser A's advertisement is associated with an eCTL of 0.5, while advertiser B selects a $0.80 CPC bid and advertiser B's advertisement is associated with an eCTL of 0.9. In this example, Advertiser A will have a selection score of 0.5, while advertiser B will have an auction score of 0.72. Thus, advertiser B will be the auction winner in this example, even though advertiser A submitted the higher CPC bid.

When the selection score is defined to be a product of a bid and an eCTL that are associated with an advertisement, the advertisement that is associated with a higher eCTL will be selected for presentation ahead of the advertisement that is associated with a lower eCTL, assuming that the two advertisements are associated with a same bid. Similarly, if two advertisements have the same eCTL, the advertisement that is associated with a higher bid will be selected for presentation over the advertisement that is associated with the lower bid.

When a request for advertisements (or other content items) is received by the advertisement management system 110, the advertisement management system 110 can identify selection criteria (e.g., a search query, resource keyword, size restrictions, and other criteria). Using the selection criteria, the advertisement management system 110 selects a set of eligible advertisements that are responsive to the request. In turn, the advertisement management system 110 obtains an eCTL that is computed for each of the eligible advertisements using an outcome estimation model.

Outcome estimation models can be trained using various different modeling techniques (e.g., regression or ranking training algorithms). Outcome estimation models can be trained, for example, using feature values of content items and previous outcomes (e.g., click-through-rates) associated with the content items. First, the outcome estimation model is initially trained on a first set of content items and the feature values associated with the content items. The model is then used to generate estimated outcomes using feature values of additional content items (e.g., that were not used to train the model). The estimated outcomes and previous outcomes associated with the additional content items are then used to compute an accuracy measure (e.g., an area under the curve measure or a log likelihood measure) for the model. If the accuracy measure is within an accuracy threshold, the model is categorized as a trained model. Otherwise, the model continues to be iteratively trained and analyzed until the accuracy measure for the model is within the accuracy threshold.

The environment 100 includes a modeling apparatus 120 that evaluates the accuracy of outcome estimation models. As noted above, outcome estimation model accuracy is generally evaluated based on a measure of error that is computed using the estimated outcome relative to previous actual outcome that are associated with content items. However, analyzing the accuracy of the outcome estimation model based solely on the actual outcomes that are associated with content items may not accurately reflect the accuracy of the outcome estimation model because the actual outcomes (e.g., click-through-rates) of content items depend on user behavior following presentation of content items, and user behavior can vary for many different reasons. Therefore, the modeling apparatus 120 is configured to evaluate model accuracy using tracer data.

As described above, tracer data specify feature values for a reference content item that has a pre-defined reference performance measure. Tracer advertisements are reference content items with which outcome estimation model accuracy can be evaluated. A tracer advertisement may be an advertisement that is ineligible for display to a user in response to an advertisement request (i.e., not served as part of the normal advertisement serving process), but is associated with (e.g., indexed according to or stored at a memory location assigned to) a reference performance measure that has been pre-defined for the tracer advertisement, as described in more detail below. The tracer data that are used by the modeling apparatus 120 can be stored, for example, in a tracer data store 119*c*.

The feature values that are included in tracer data can include feature values that are unique for the tracer advertisement (e.g., tracer keywords described below), as well as feature values that are also shared by real advertisements that are presented to users. For example, tracer advertisements and real advertisements can each include a feature value representing the time of day at which presentation of the advertisement occurred. Other feature values can also be shared between tracer advertisements and real advertisements, as long as the tracer advertisements include a set of one or more unique feature values (i.e., relative to the real advertisements), such as a tracer keyword.

Tracer advertisements may have tracer keywords (i.e., targeting keywords that have been selected for targeting a reference content item) that have never been received with requests for advertisements (e.g., never been received with advertisement requests as search queries or as resource keywords). Alternatively, the tracer keywords with which tracer advertisements are targeted can be keywords that have been received with requests for advertisements (or as search queries) less than a threshold quantity of times (e.g., included in less than an absolute threshold number of received advertisement requests or included in less than a threshold percentage of all content item requests).

For example, the modeling apparatus 120 can select a string of fifty pseudo-randomly selected characters as the targeting keyword for a tracer advertisement. The modeling apparatus 120 can also access and/or analyze the performance data 119*b* to determine whether the tracer keyword has ever been received with a request for an advertisement and/or to determine whether the tracer keyword has been received less than the threshold quantity of times (e.g., received fewer than n times, where n is a predefined number). In turn, the modeling apparatus 120 assigns the tracer keyword to the tracer advertisement when the tracer keyword has been received less than the threshold quantity of times.

Restricting tracer keywords to keywords that have never been received (or received less than a threshold quantity of times) reduces the likelihood that the tracer advertisement will be selected for presentation to a user, which, in turn, reduces the likelihood that the reference performance measure for the reference advertisement will vary based on user interactions with the reference advertisement. In some implementations, a tracer advertisement can be flagged (e.g., stored with a data flag or other data) specifying that the tracer advertisement is ineligible for display on user devices that are not included in a whitelist of devices. The whitelist of devices can be, for example, limited to devices that are under control of an administrator of the modeling apparatus to prevent distribution of the tracer advertisements. Alternatively, the tracer advertisement can be an advertisement that is acceptable for display (e.g., a public service announcement) if a user does search for the tracer data keyword.

The tracer data also include performance data that specify a reference performance measures for tracer advertisements. In some implementations, the reference performance measures are static and defined at the time of the tracer data creation (i.e., prior to using the tracer advertisement to evaluate the accuracy of the outcome estimation model). Because tracer advertisements are targeted to a unique keyword (i.e., a keyword with which real advertisements are unlikely to be targeted) and have a static reference performance measure, the model for the tracer keyword will be trained independent of performance data that represent actual user selections of the tracer advertisement. Therefore, the modeling apparatus 120 can use the tracer performance data as ground truth data to test the accuracy of an outcome estimation model independent of user behavior.

Assuming that the tracer advertisement shares one or more feature values with real advertisements, changes in the accuracy of real estimations (i.e., performance estimations for advertisements that are presented to users), can be compared to the changes in the accuracy of tracer estimations (i.e., performance estimations for tracer advertisements) to determine a potential cause for the change in accuracy for the real estimations. For example, if the change in accuracy of the tracer estimations remains substantially constant, while the accuracy of the real estimations changes substantially, it is likely that the accuracy changes for the real estimations are being caused by changes in user behavior. However, if both the real estimations and the tracer estimations experience substantial accuracy changes, it is likely that there has been a sudden change in the shared feature values (e.g., due to data corruption).

As noted above, user behavior can change at various times during a day, on a seasonal basis, or due to sudden and/or temporary changes in personal preference. Additionally, a particular user's actual behavior (e.g., likelihood to click on a particular advertisement) may be difficult to predict. Thus, using tracer data that specify a constant reference performance measure with which the accuracy of the outcome estimation can be evaluated provides a reference accuracy measure against which the performance of the outcome estimation model can be evaluated.

As described in more detail below, the reference performance measures that are specified by tracer data can be computed using tracer data that is generated by the modeling apparatus 120 (or another data processing apparatus). The reference performance measures can also be computed using tracer interaction data that specify interactions with tracer advertisements (or other reference content items) by the modeling apparatus 120. In some implementations, the modeling apparatus 120 is configured to automatically submit tracer search queries and select tracer advertisements at a pre-specified rate. For example, the modeling apparatus 120 can be configured to submit a tracer search query that matches a tracer keyword, receive tracer advertisements that are targeted to the tracer keyword, and to select (i.e., send data representing a click) the respective tracer advertisements at pre-defined rates.

The interactions with the tracer advertisements (i.e., the presentations and selections) can be logged as tracer interaction data in the tracer data store 119*c* in a manner similar to that in which user interactions with advertisements from the advertisement data store 119*a* (i.e., non-tracer advertisements) are stored in the performance data store 119*b*. In turn, the reference performance measures can be computed using the logged tracer interaction data. Since the modeling apparatus 120 selects (i.e., provides data specifying a click of) the tracer advertisements at pre-defined rates, the performance measures for the tracer advertisements remain substantially constant over time.

In some implementations, the model apparatus 120 generates a tracer performance log that is populated with a set of tracer performance data interactions. The tracer performance log can be generated without requiring submission of a search query that matches the tracer keyword and without requiring "selection" of the tracer advertisement, as described above. For example, the tracer performance log can be data specifying that each of the tracer advertisements was presented and/or selected at pre-defined rates, even if no interactions (e.g., presentations or selections) with the tracer advertisers occurred. The tracer performance data that are included in the tracer performance log can be formatted in a manner similar to that of performance data that are stored in the performance data store 119*b*. Thus, the tracer performance data can be analyzed in a manner similar to that by which advertisement performance data are analyzed. The modeling apparatus 120 can store the tracer performance log in the tracer data store 119*c*.

The modeling apparatus 120 uses the tracer data to determine an accuracy measure for outcome estimation models. For example, the modeling apparatus 120 can use an outcome estimation model to calculate an eCTL for a tracer advertisement using the tracer data. This eCTL can be compared to the reference performance measure specified by the tracer data to create an accuracy measure (e.g., an area under the curve measure or a log likelihood measure) for the outcome estimation model. The accuracy measure can then be used to validate the model and/or to determine whether to retrain the model or select a different model.

In some implementations, multiple models can be evaluated based on accuracy measures that have been computed for each of the models. These accuracy measures can be used, for example, to select which of the outcome estimation models is used to compute the eCTL for eligible advertisements. For example, the model having the highest accuracy measure (i.e., the lowest error measure) can be selected as the model with which the eCTL for eligible advertisements is determined.

Figure 2:
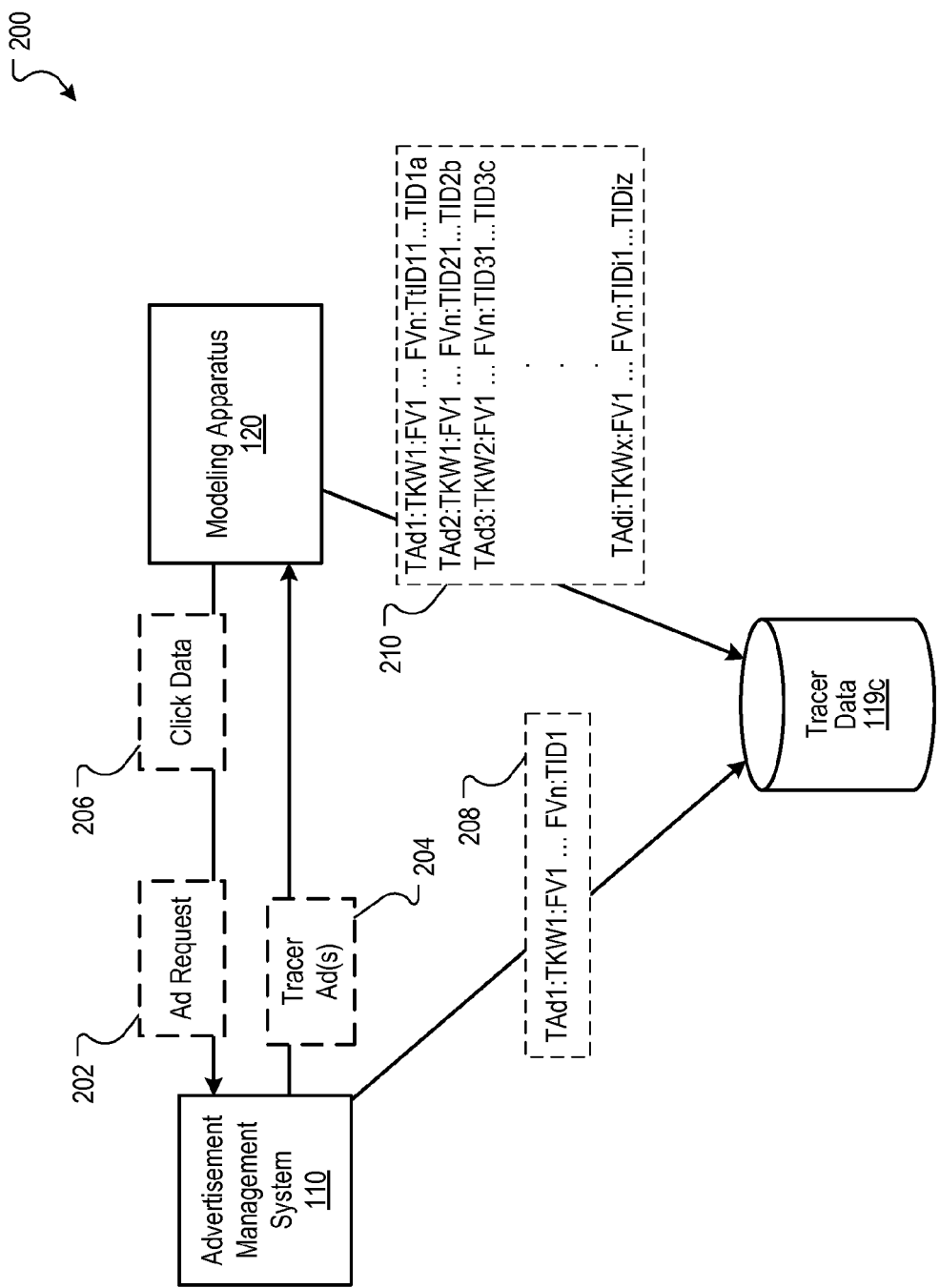
FIG. 2 is a block diagram of an example environment in which an advertisement management system and a modeling apparatus generate tracer data.

FIG. 2 is a block diagram of an example environment 200 in which tracer data are generated by the modeling apparatus 120. Two techniques for generating tracer data are described with reference to FIG. 2. According to a first technique, tracer data are generated in a manner similar to that by which performance data for eligible advertisements are generated.

In some implementations, the modeling apparatus 120 is configured to interact with tracer advertisements in manner similar to that by which the user devices 106 interact with eligible advertisements to generate tracer log entries 210. For example, the modeling apparatus 120 can submit, to the advertisement management system, a request for advertisements 202 that includes a tracer keyword. In turn, the advertisement management system 110 uses the tracer keyword to select one or more advertisements to be provided in response to the request. For example, the advertisement management system 110 can provide the modeling apparatus 120 with one or more tracer advertisements 204 that are targeted using the tracer keyword. In response to receiving the tracer advertisements 204, the modeling apparatus can generate click data 206 (i.e., interaction data specifying the occurrence of a click of the tracer advertisement)

In some implementations, the modeling apparatus 120 can transmit click data 206, for each respective tracer advertisement, according to the reference performance measure for the respective tracer advertisement. As described above, the reference performance measure for each respective tracer advertisement can define, among other metrics, a pre-defined click through rate (e.g., a click probability) for the respective tracer advertisement. For example, if the modeling apparatus 120 uses a reference performance measure specifying a click-through-rate of 0.3 for a particular tracer advertisement, the modeling apparatus 120 can generate click data 206 for 3 out of every 10 instances that the particular tracer advertisement is provided to the modeling apparatus 120.

The particular instances for which the click data 206 are generated can be determined, for example, using a probability constrained pseudo-random number generator. For example, in response to receiving the tracer advertisement, the value output from the pseudo-random number generator and the reference performance measure can be used to determine whether the click data 206 are generated. The probability with which particular values are output by the pseudo-random number generator can be constrained, for example, by the reference performance measure for the tracer advertisement. In the example above, the pseudo-random number generator can be programmed to pseudo-randomly provide values that result in generation of the click data 206 with a probability of 30%, such that the pseudo-random number generator is probability constrained by the click-through-rate of the tracer advertisement.

The advertisement management system 110 receives the click data 206 and can generate a tracer log entry 208. The tracer log entry 208 can include, for example, an identifier (e.g., TAd1) for the tracer advertisement 204, the tracer keyword (e.g., TKW1) that was matched by the advertisement request 202, and tracer interaction data (e.g., TID1) specifying, for example, whether the tracer advertisement 204 was clicked. In turn, the advertisement management system 110 can transmit the tracer log entry 208 to the tracer data store 119c, where the tracer log entry 208 can be stored and/or accessed by the modeling apparatus 120.

The modeling apparatus 120 may communicate with the advertisement management system 110 and/or the tracer data store 119c either by a public network, such as the Internet, or by a local network. For example, the modeling apparatus 120 can be housed in the same datacenter as the advertisement management system 110 so that the administrator that monitors the activities of the modeling apparatus 120 also has access to the advertisement management system 110.

A second technique for generating tracer data is a technique by which the modeling apparatus 120 generates a tracer performance log 210 that includes a set of tracer log entries for a set of tracer advertisements. The tracer performance log 210 is generated by the modeling apparatus 120 independent of any interaction between the advertisement management system 110 and the modeling apparatus 120. For example, the tracer performance log can be generated without requiring the modeling apparatus 120 to submit any advertisement requests to the advertisement management system 110, receive any tracer advertisements from the advertisement management system 110, or providing click data to the advertisement management system 120.

The set of tracer data log entries in the tracer performance log 210 can specify identifiers (e.g., TAd1 . . . TAdi) for the respective tracer advertisements, tracer keywords (e.g., TKW1 . . . TKWx) for the respective tracer advertisements, feature values (e.g., FV1 . . . FVn) for the respective tracer advertisements, and tracer interaction data (e.g., TID11 . . . TIDiz) for the respective tracer advertisements. For each respective tracer advertisement that is referenced by the tracer performance log 210, the percentage of the tracer interaction data that specify the occurrence of a click of the tracer advertisement is equal to the reference performance measure for the tracer advertisement. For example, if the reference performance measure for a particular tracer advertisement is 0.3, 30% of the tracer interaction data for the particular tracer advertisement will include data specifying that the particular tracer advertisement was clicked, while 70% of the tracer interaction data for the particular advertisement will include data specifying the particular tracer advertisement was not clicked. The modeling apparatus 120 can set additional information in the tracer performance log 210 to constant values, to pseudo-random values, or to evenly spaced values (or according to a specified value distribution) in a particular range (e.g., time stamps set to 1:00 AM, 2:00 AM, 3:00 AM to 12:00 PM.)

The modeling apparatus 120 can transmit a complete tracer performance log 210 to the tracer data store 119c, or transmit batches of tracer log entries. In some implementations, the modeling apparatus 120 can transmit the tracer performance log 210 to the advertisement management system 110 for submission to the tracer data store 119c, or the modeling apparatus 120 can use a proxy for the advertisement management system 110. In some cases, submitting the tracer log entries 210 through the advertisement management system 110 or through a proxy facilitates the submission of tracer log entries 210 to the tracer data store 119c without the need to modify the communication interface used by the tracer data store 119c.

Figure 3:
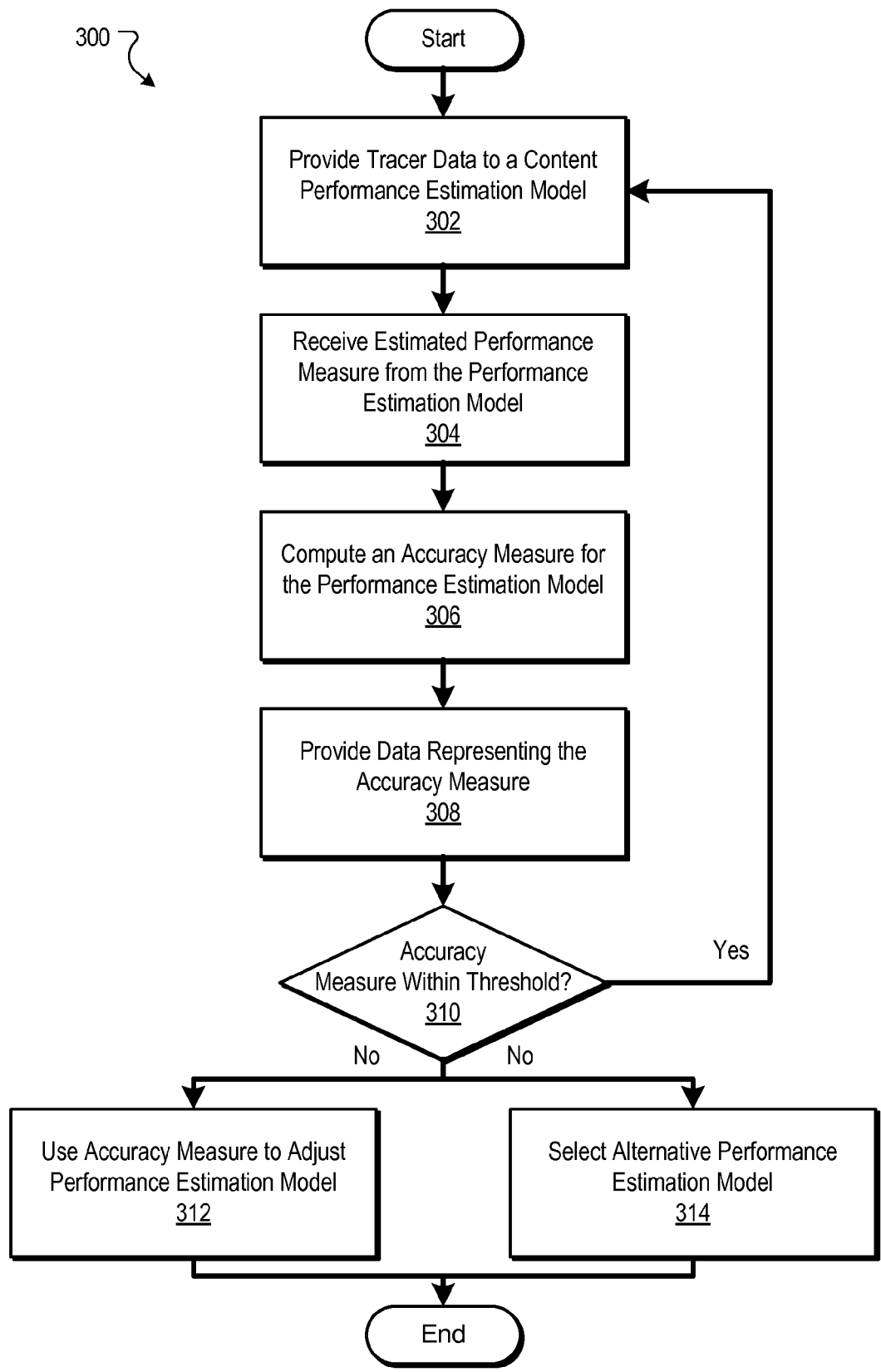
FIG. 3 is a flowchart of an example process for evaluating the accuracy of a performance estimation model.

FIG. 3 is a flowchart of an example process 300 for evaluating the accuracy of a performance estimation model. The process 300 is a process by which tracer data that specify reference performance values for a reference content item are provided to a content performance estimation model. The content performance estimation model uses the tracer data to compute an estimated performance measure for the reference content item. In turn, the estimated performance measure is compared to the reference performance values to test the accuracy of the performance estimation model. Based on the comparison, the performance estimation model can be adjusted, or a different performance estimation model can be used to estimate performance measures for content items.

The process 300 can be implemented, for example, by the modeling apparatus 120 and/or the advertisement management system 110 of FIG. 1. In some implementations, the modeling apparatus 120 and/or the advertisement management system 110 are each data processing apparatus that include one or more processors configured to perform actions of the process 300. In some implementations, a computer readable medium can include instructions that when executed by a computer cause the computer to perform actions of the process 300.

Tracer data are provided to a content performance estimation model (302). In some implementations, the content performance estimation model is a model that has been trained to estimate performance measures for content items. A performance estimation model may be trained using feature values of content items that have been provided to user devices and performance measures for the provided content items. For example, the modeling apparatus 120 of FIG. 1 can train a performance estimation model with features such as advertisement text, color, and animation to estimate click-through-rates for advertisements based on the advertisements' respective feature values.

The tracer data specify feature values for a reference content item that has a pre-defined reference performance measure. As described above, the tracer data can also include data that specify the reference performance measure for the reference content item. The reference performance measure can be, for example, a constant performance value (e.g., a click-through-rate of 0.3) that is included in the tracer data, a value that is computed from a tracer performance log(e.g., tracer performance log 210 of FIG. 2), or computed based on click data (e.g., click data 208 of FIG. 2). In some implementations, the tracer data for the reference content item are stored in a data store (e.g., tracer data store 119c of FIGS. 1 and 2).

In some implementations, the reference content items are advertisements (or other content items) that are not eligible to be displayed to a user (i.e., tracer advertisements). The reference content items can be associated with (i.e., indexed according to and/or stored with) a data tag that prevents the reference content items from being presented to a user device for which content items are being requested. For example, the data tag can specify that the reference content items are only eligible to be provided to a pre-specified set of devices (e.g., devices included in, or associated with, the modeling apparatus 120 of FIG. 1).

As described above, a reference content item can also be targeted using a tracer keyword (e.g., a pseudo-randomly selected set of 50 characters) to prevent (or significantly reduce) the likelihood that the reference content item is provided to a user device so that user interactions with the reference content item do not skew the reference performance measure. The tracer keyword can be, for example, a character string, phrase, or another n-gram that has never been received with an advertisement request (e.g., as a search query or resource keyword). Alternatively, the tracer keyword can be a character string, phrase, or other n-gram that has been received with advertisement requests less than a threshold quantity of times or from a threshold number of unique user devices (e.g., 2 user devices).

An estimated performance measure that was computed for the reference content item is received (304). In some implementations, the estimated performance measure is received as an output from the performance estimation model. The estimated performance measure for the reference content item can be computed by the performance estimation model, for example, using the tracer data that was provided to the content performance estimation model. The estimated performance measure can be, for example, an estimated click-through-rate for the reference content item. The estimated performance measure can be received, for example, by the model modeling apparatus 120 of FIGS. 1 and 2.

An accuracy measure is computed for the content performance estimation model (306). In some implementations, the accuracy measure is computed using the estimated performance measure and the reference performance measure. For example, the modeling apparatus 120 can compare an estimated click-through-rate for a reference content item relative to a pre-defined click-through-rate to determine an accuracy measure for the performance estimation model. The accuracy measure may be calculated by one or more metrics, such as a log likelihood measure or an area under the curve measure. Other accuracy measures can also be used (e.g., mean square error).

Data that specify the accuracy measure for the content performance estimation model are provided (308). The data that specify the accuracy measure can be provided, for example, for presentation on a display device and/or to the advertisement management system 110 for further processing. The data can also be made available for additional processing within the modeling apparatus 120, as described below.

In some implementations, the accuracy measure can be used to adjust the performance estimation model and/or select an alternative performance estimation model for estimating performance measures for content item. In these implementations, a determination is made whether the accuracy measure meets an accuracy threshold (310). For example, the accuracy measure can be compared to the accuracy threshold to determine whether the accuracy measure is equal to the accuracy threshold within an acceptable range of accuracy values. The accuracy threshold can specify a target accuracy measure, such as a target area under the curve measure or a target log likelihood measure. The accuracy threshold can also specify an acceptable variance from the target accuracy measure. For example, the accuracy threshold can specify that accuracy measures that are within 10% of the target accuracy measure are acceptable accuracy measures.

In response to determining that the accuracy measure meets the accuracy threshold, tracer data can be provided to the content performance estimation model (302). In response to determining that the accuracy measure does not meet the accuracy threshold, one or more actions can be performed to attempt to improve the accuracy measure.

In some implementations, the performance estimation model is adjusted in response to determining that the accuracy measure does not meet the accuracy threshold (312). For example, the modeling apparatus 120 can iteratively adjust weights (e.g., values that represent relative importance of respective feature values for estimating content item performance) of the performance estimation model and provide tracer data to the content estimation model (302) until the accuracy of the performance estimation model is within the accuracy threshold.

In some implementations, a different performance estimation model is selected in response to determining that the accuracy measure is not within the accuracy threshold (312). For example, the modeling apparatus 120 can select an alternate performance estimation model for estimating performance measures for advertisements. In some implementations, the modeling apparatus 120 can train multiple performance estimation models using different modeling techniques (e.g., regression based techniques and/or ranking based techniques). The actions 302-308 can be repeated for each of the performance estimation model to generate an accuracy measure for each performance estimation models. The model having an accuracy measure that is within the accuracy threshold (or the model having the highest accuracy measure) can be selected for use by the modeling apparatus 120.

In some implementations, steps 312 and 314 may be alternative actions that can be selected, for example, based on the value of the accuracy measure of the performance estimation model. If the accuracy measure is near (e.g., within an adjustment threshold) the accuracy threshold, the model may be adjusted (310) to improve the accuracy measure until the accuracy measure is within the accuracy threshold. If the accuracy measure is not near the accuracy threshold (e.g., not within the adjustment threshold), a different model may be selected (312).

Figure 4:
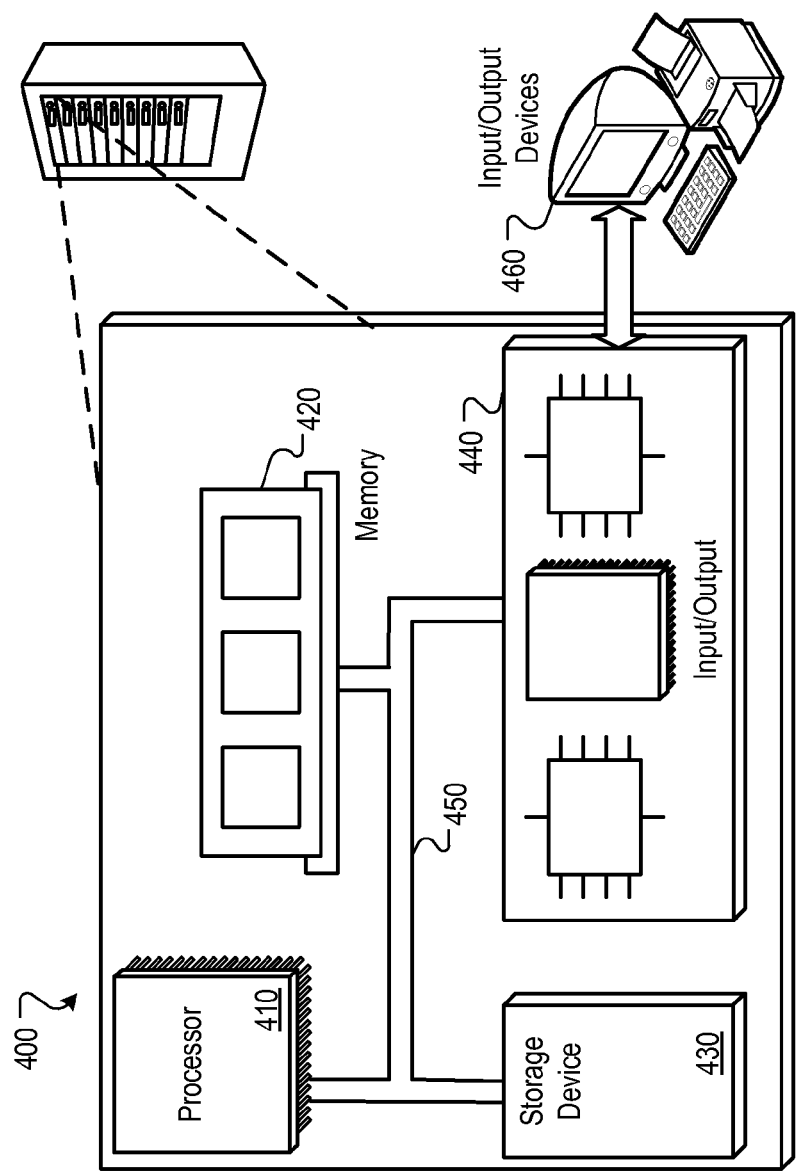
FIG. 4 is block diagram of an example computer system that can be used to evaluate, train, and/or adjust outcome estimation models.

FIG. 4 is block diagram of an example computer system 400 that can be used to evaluate, train, and/or adjust outcome estimation models, as described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   providing tracer data to a content performance estimation model, the tracer data specifying feature values for a reference content item, the reference content item being a content item having a tracer keyword phrase that has been received from less than a threshold quantity of user devices and for which a reference performance measure is pre-defined;
   receiving, from the performance estimation model, an estimated performance measure that was computed by the performance estimation model based on the tracer data for the reference content item; and
   computing an accuracy measure for the content performance estimation model, the accuracy measure being computed using the estimated performance measure and the reference performance measure.

2. The method of claim 1, wherein the content performance estimation model is a model that has been trained to estimate performance measures for eligible content items that are eligible to be provided to user devices, and wherein the model is trained using feature values of content items that have been provided to user devices and performance measures for the provided content items.

3. The method of claim 1, further comprising:
  determining that the accuracy measure does not meet an accuracy threshold; and
  adjusting the content performance estimation model in response to the determination.

4. The method of claim 1, the method further comprising:
  determining that the accuracy measure does not meet an accuracy threshold; and
  selecting a different content performance estimation model in response to the determination.

5. The method of claim 1, wherein the reference performance measure for the reference content item is substantially constant.

6. A method performed by data processing apparatus, the method comprising:
  identifying a tracer keyword candidate for a reference content item having a pre-defined reference performance measure that is independent of presentation of the reference content item;
  determining that the tracer keyword candidate has not been included in a search query received from a user device; and
  in response to determining that the tracer keyword candidate has not been included in a search query received from a user device, identifying the tracer keyword candidate as a tracer keyword for the reference content item;
  providing, to a content performance estimation model, tracer data specifying feature values for the reference content item associated with the tracer keyword;
  receiving, from the performance estimation model, an estimated performance measure that was computed by the performance estimation model for the reference content item;
  computing an accuracy measure for the content performance estimation model based on the estimated performance measure and the reference performance measure; and
  providing data that specify the accuracy measure for the content performance estimation model.

7. A method performed by data processing apparatus, the method comprising:
  providing tracer data to a content performance estimation model, the tracer data specifying feature values for a reference content item, the reference content item being a content item that is not distributed to users and for which a reference performance measure is pre-defined wherein providing tracer data comprises providing tracer data for a reference content item that is targeted for presentation using a tracer keyword, and wherein the tracer keyword is a phrase that has been received from less than a threshold quantity of user devices;
  receiving, from the performance estimation model, an estimated performance measure that was computed by the performance estimation model for the reference content item;
  computing an accuracy measure for the content performance estimation model, the accuracy measure being computed using the estimated performance measure and the reference performance measure; and
  providing data that specify the accuracy measure for the content performance estimation model.

8. The method of claim 1, wherein providing tracer data to a content performance estimation model comprises providing tracer data for a content item that is not eligible to be presented in response to requests for content items that are being requested for a user device.

9. The method of claim 1, wherein computing an accuracy measure comprises computing a log likelihood measure using the estimated performance measure and the reference performance measure.

10. The method of claim 1, wherein computing an accuracy measure comprises computing an area under a curve measure.

11. The method of claim 1, further comprising generating a tracer performance log that includes a set of tracer log entries, each tracer log entry specifying tracer interaction data for a reference content item, the tracer interaction data for each reference content item specifying a quantity of interactions that is based on the reference performance measure for the reference content item.

12. A method, comprising:
  providing tracer data to a content performance estimation model, the tracer data specifying feature values for a reference content item, the reference content item being a content item that is not distributed to users and for which a reference performance measure is pre-defined;
  receiving, from the performance estimation model, an estimated performance measure that was computed by the performance estimation model based on the tracer data for the reference content item;
  computing an accuracy measure for the content performance estimation model, the accuracy measure being computed using the estimated performance measure and the reference performance measure;
  providing data that specify the accuracy measure for the content performance estimation model;
  submitting a request for a content item, the request including a tracer keyword that has been received from fewer than a predefined number of user devices;
  receiving the reference content item in response to submitting the request; and
  providing click data specifying an interaction with the reference content item, the click data being provided with a probability based on the reference performance measure.

13. A non-transitory computer storage medium encoded with a computer program, the program comprising instructions that when executed by data processing apparatus cause the data processing apparatus to perform operations comprising:
  providing tracer data to a content performance estimation model, the tracer data specifying feature values for a reference content item, the reference content item being a content item having a tracer keyword phrase that has been received from less than a threshold quantity of user devices and for which a reference performance measure is pre-defined;
  receiving, from the performance estimation model, an estimated performance measure that was computed by the performance estimation model based on the tracer data for the reference content item; and computing an accuracy measure for the content performance estimation model, the accuracy measure being computed using the estimated performance measure and the reference performance measure.

14. A system comprising:
  a data store storing tracer data that specify feature values for a reference content item, the reference content item being a content item having a tracer keyword phrase that has been received from less than a threshold quantity of user devices and for which a reference performance measure is pre-defined; and one or more computers operable to interact with the data store and to perform operations including:
  providing the tracer data to a content performance estimation model;
  receiving, from the performance estimation model, an estimated performance measure that was computed by the performance estimation model based on the tracer data for the reference content item; and
  computing an accuracy measure for the content performance estimation model, the accuracy measure being computed using the estimated performance measure and the reference performance measure.

15. The system of claim 14, wherein the one or more computers further perform operations including:
  determining that the accuracy measure does not meet an accuracy threshold; and
  adjusting the content performance estimation model in response to the determination.

16. The system of claim 14, wherein the one or more computers further perform operations including:
  determining that the accuracy measure does not meet an accuracy threshold; and
  selecting a different content performance estimation model in response to the determination.

17. The system of claim 14, wherein the content performance estimation model is a model that has been trained to estimate performance measures for eligible content items that are eligible to be provided to user devices, and wherein the model is trained using feature values of content items that have been provided to user devices and performance measures for the provided content items.

18. The system of claim 14, wherein the reference performance measure for the reference content item being substantially constant.

19. The system of claim 14, wherein the one or more computers further perform operations including providing tracer data for a reference content item that is targeted for presentation using a tracer keyword.

20. A system, comprising:
a data store storing tracer data that specify feature values for a reference content item, the reference content item being a content item having a tracer keyword phrase that has been received from less than a threshold quantity of user devices and for which a reference performance measure is pre-defined; and
one or more computers operable to interact with the data store and to perform operations including:
  providing, to a content performance estimation model, the tracer data for a reference content item that is targeted for presentation using a tracer keyword, wherein the tracer keyword is a phrase that has been received from less than a threshold quantity of user devices;
  receiving, from the performance estimation model, an estimated performance measure that was computed by the performance estimation model based on the tracer data for the reference content item;
  computing an accuracy measure for the content performance estimation model, the accuracy measure being computed using the estimated performance measure and the reference performance measure; and
  providing data that specify the accuracy measure for the content performance estimation model.

21. A system, comprising:
a data store storing tracer data that specify feature values for a reference content item, the reference content item being a content item having a tracer keyword phrase that has been received from less than a threshold quantity of user devices and for which a reference performance measure is pre-defined; and
one or more computers operable to interact with the data store and to perform operations including:
  providing, to a content performance estimation model, the tracer data for a reference content item that is targeted for presentation using a tracer keyword;
  receiving, from the performance estimation model, an estimated performance measure that was computed by the performance estimation model based on the tracer data for the reference content item;
  computing an accuracy measure for the content performance estimation model, the accuracy measure being computed using the estimated performance measure and the reference performance measure; and
  providing data that specify the accuracy measure for the content performance estimation model, wherein the one or more computers further perform operations including generating a tracer performance log that includes a set of tracer log entries, each tracer log entry specifying tracer interaction data for a reference content item, the tracer interaction data for each reference content item specifying a quantity of interactions that is based on the reference performance measure for the reference content item.

22. A system, comprising:
a data store storing tracer data that specify feature values for a reference content item, the reference content item being a content item having a tracer keyword phrase that has been received from less than a threshold quantity of user devices and for which a reference performance measure is pre-defined; and
one or more computers operable to interact with the data store and to perform operations including:
  providing, to a content performance estimation model, the tracer data for a reference content item that is targeted for presentation using a tracer keyword;
  receiving, from the performance estimation model, an estimated performance measure that was computed by the performance estimation model based on the tracer data for the reference content item;
  computing an accuracy measure for the content performance estimation model, the accuracy measure being computed using the estimated performance measure and the reference performance measure; and
  providing data that specify the accuracy measure for the content performance estimation model, wherein the one or more computers further perform operations including:
    submitting a request for a content item, the request including a tracer keyword that has been received from less than a threshold number of user devices;
    receiving the reference content item in response to submitting the request; and
    providing click data specifying an interaction with the reference content item, the click data being provided with a probability based on the reference performance measure.

* * * * *